United States Patent
Haynes et al.

(10) Patent No.: US 10,808,854 B2
(45) Date of Patent: Oct. 20, 2020

(54) VENTING INFLATION VALVE ASPIRATOR

(71) Applicant: GOODRICH CORPORATION, Charlotte, NC (US)

(72) Inventors: Timothy C Haynes, Prescott Valley, AZ (US); Michael A Luzader, Laveen, AZ (US)

(73) Assignee: Goodrich Corporation, Charlotte, NC (US)

( * ) Notice: Subject to any disclaimer, the term of this patent is extended or adjusted under 35 U.S.C. 154(b) by 90 days.

(21) Appl. No.: 16/213,502

(22) Filed: Dec. 7, 2018

(65) Prior Publication Data

US 2020/0182364 A1    Jun. 11, 2020

(51) Int. Cl.
*F16K 15/20* (2006.01)
*B64D 25/14* (2006.01)
*F04F 5/16* (2006.01)

(52) U.S. Cl.
CPC .......... *F16K 15/207* (2013.01); *B64D 25/14* (2013.01); *F04F 5/16* (2013.01); *Y10T 137/2526* (2015.04); *Y10T 137/36* (2015.04)

(58) Field of Classification Search
CPC ... F16K 15/207; F04F 5/14; F04F 5/16; F04F 5/18; F04F 5/466; Y10T 137/2544; Y10T 137/36; Y10T 137/3646; Y10T 137/87643; Y10T 137/2526; B64D 25/14
See application file for complete search history.

(56) References Cited

U.S. PATENT DOCUMENTS

| | | | |
|---|---|---|---|
| 4,368,009 A * | 1/1983 | Heimovics, Jr. | B61B 12/005 417/179 |
| 4,566,862 A | 1/1986 | Halavais | |
| 5,002,465 A | 3/1991 | Lagen et al. | |
| 6,071,084 A * | 6/2000 | Wass | F04F 5/463 137/888 |
| 6,240,951 B1 * | 6/2001 | Yori | F16K 15/207 137/224 |
| 2004/0129311 A1 | 7/2004 | Courtney | |

* cited by examiner

*Primary Examiner* — Kevin F Murphy
(74) *Attorney, Agent, or Firm* — Snell & Wilmer L.L.P.

(57) ABSTRACT

An aspirator may comprise an aspirator body defining an air channel, an aspirator inlet disposed in the aspirator body whereby the air channel receives a compressed fluid, a venting aperture disposed in the aspirator body in fluid communication with the air channel, and a venting valve disposed in the venting aperture. The venting valve is in an open position and the venting valve moves to a closed position in response to the compressed fluid being received by the aspirator.

20 Claims, 9 Drawing Sheets

VENTING INFLATION VALVE ASPIRATOR

FIELD

The present disclosure is directed to evacuation systems for use in aircraft and, more particularly, to aspirators for inflating evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and an aspirator. The aspirator, working with the compressed fluid source, combines ambient air from the atmosphere and the fluid to provide gas for inflating the emergency evacuation devices.

SUMMARY

An aspirator is disclosed, comprising an aspirator body defining an air channel, an aspirator inlet disposed in the aspirator body whereby the air channel receives a compressed fluid, a venting aperture disposed in the aspirator body in fluid communication with the air channel, and a venting valve disposed in the venting aperture, wherein the venting valve is in an open position and the venting valve moves to a closed position in response to the compressed fluid being received by the aspirator.

In various embodiments, the venting valve allows fluid to travel freely between the air channel and the venting aperture in the open position.

In various embodiments, a force generated by the compressed fluid moves the venting valve to the closed position.

In various embodiments, the aspirator body comprises a barrel outer wall and a barrel inner wall, the barrel inner wall defining the air channel.

In various embodiments, the aspirator further comprises a vent cap coupled to the aspirator body, wherein the vent cap secures the venting valve in the open position.

In various embodiments, at least a portion of the vent cap moves out from the venting aperture in response to the venting valve moving to the closed position.

In various embodiments, the venting valve comprises a valve body, a valve core sleeve, a valve core piston, and a gasket coupled to the valve core piston, wherein the valve core piston moves with respect to the valve core sleeve and the gasket contacts the valve core sleeve in response to the valve core piston moving to the closed position.

In various embodiments, the venting valve further comprises a spring member configured to bias the venting valve towards the open position.

In various embodiments, the aspirator further comprises an inflatable evacuation device coupled to the aspirator body.

An evacuation system is disclosed, comprising an aspirator coupled to an inflatable evacuation device, and a compressed fluid source coupled to the aspirator via a pipe assembly. The aspirator comprises an aspirator body defining an air channel, an aspirator inlet disposed in the aspirator body whereby the air channel receives a compressed fluid from the compressed fluid source, a venting aperture disposed in the aspirator body in fluid communication with the air channel, and a venting valve disposed in the venting aperture, wherein the venting valve is in an open position and the venting valve moves to a closed position in response to the compressed fluid being received by the aspirator.

In various embodiments, the venting valve allows fluid to travel freely between the air channel and the venting aperture in the open position.

In various embodiments, a force generated by the compressed fluid moves the venting valve to the closed position.

In various embodiments, the aspirator body comprises a barrel outer wall and a barrel inner wall, the barrel inner wall defining the air channel.

In various embodiments, the evacuation system further comprises a vent cap coupled to the aspirator body, wherein the vent cap secures the venting valve in the open position.

In various embodiments, at least a portion of the vent cap moves out from the venting aperture in response to the venting valve moving to the closed position.

In various embodiments, the venting valve comprises a valve body, a valve core sleeve, a valve core piston, and a gasket coupled to the valve core piston, wherein the valve core piston moves with respect to the valve core sleeve and the gasket contacts the valve core sleeve in response to the valve core piston moving to the closed position.

In various embodiments, the venting valve further comprises a spring member configured to bias the venting valve towards the open position.

An aspirator method is disclosed, comprising coupling a venting valve to an aspirator vent disposed in an aspirator body, wherein the venting valve is in fluid communication with an aspirator inlet disposed in the aspirator body and the venting valve is in fluid communication with an air channel defined by the aspirator body, wherein the venting valve is in an open position and the venting valve is configured to move to a closed position in response to the compressed fluid being received by the aspirator.

In various embodiments, the aspirator method further comprises coupling an aspirator hose fitting to the aspirator inlet, coupling a compressed fluid source to the aspirator hose fitting via a pipe assembly, and coupling the aspirator body to an inflatable evacuation device.

In various embodiments, the aspirator method further comprises coupling a vent cap to the venting aperture, wherein the vent cap secures the venting valve in the open position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
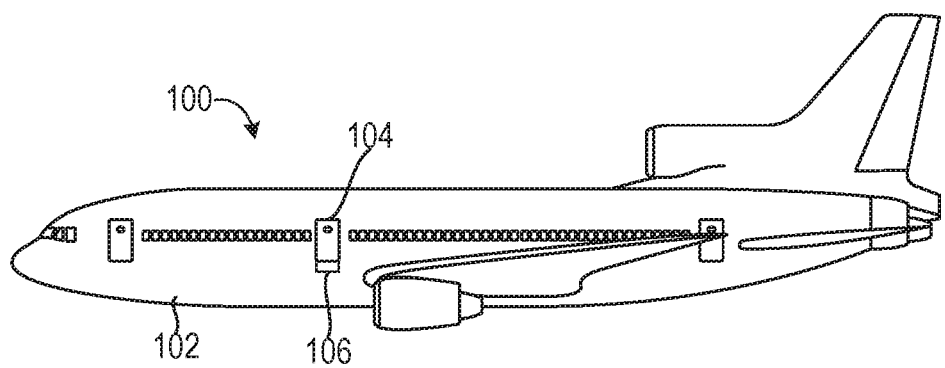
FIG. 1 illustrates a perspective view of an aircraft having an evacuation system, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

An aircraft may include an inflatable evacuation device defining an internal volume. The inflatable evacuation device is stored onboard the aircraft and may be used during an evacuation event. While stored onboard the aircraft, the inflatable evacuation device may experience variations in ambient pressure which may affect the pressure of any fluid disposed within the internal volume of the inflatable evacuation device. A decrease in ambient pressure may cause the internal volume of the inflatable evacuation device to increase which may lead to undesirable events, such as over-pressurization of the storage compartment which contains the inflatable evacuation device and/or premature deployment of the inflatable evacuation device.

A venting aspirator, as disclosed herein, includes a vent valve in fluid communication with an inlet of the aspirator whereby the aspirator receives a pressurized fluid from a compressed fluid source. The vent valve is in a default-open position to allow the inflatable evacuation device to equalize with the ambient air, thereby preventing over-pressurization of the inflatable evacuation device. The vent valve may also be used to measure the inflatable evacuation device's internal pressure, for example under testing conditions of the inflatable evacuation device. The venting aspirator may reduce the cost of fabricating and installing a vent valve and pressure check fitting to an inflatable evacuation device. The venting aspirator may reduce the pack volume of the inflatable evacuation device at least because the aspirator and the pressure check fitting are built into a single unit. The venting aspirator may reduce the risk of operator error during pressure checks. The venting aspirator may reduce setup time during inflatable evacuation device packing. The venting aspirator may provide ease of access to the vent valve for checking internal pressure.

Referring to FIG. 1, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever.

Figure 2:
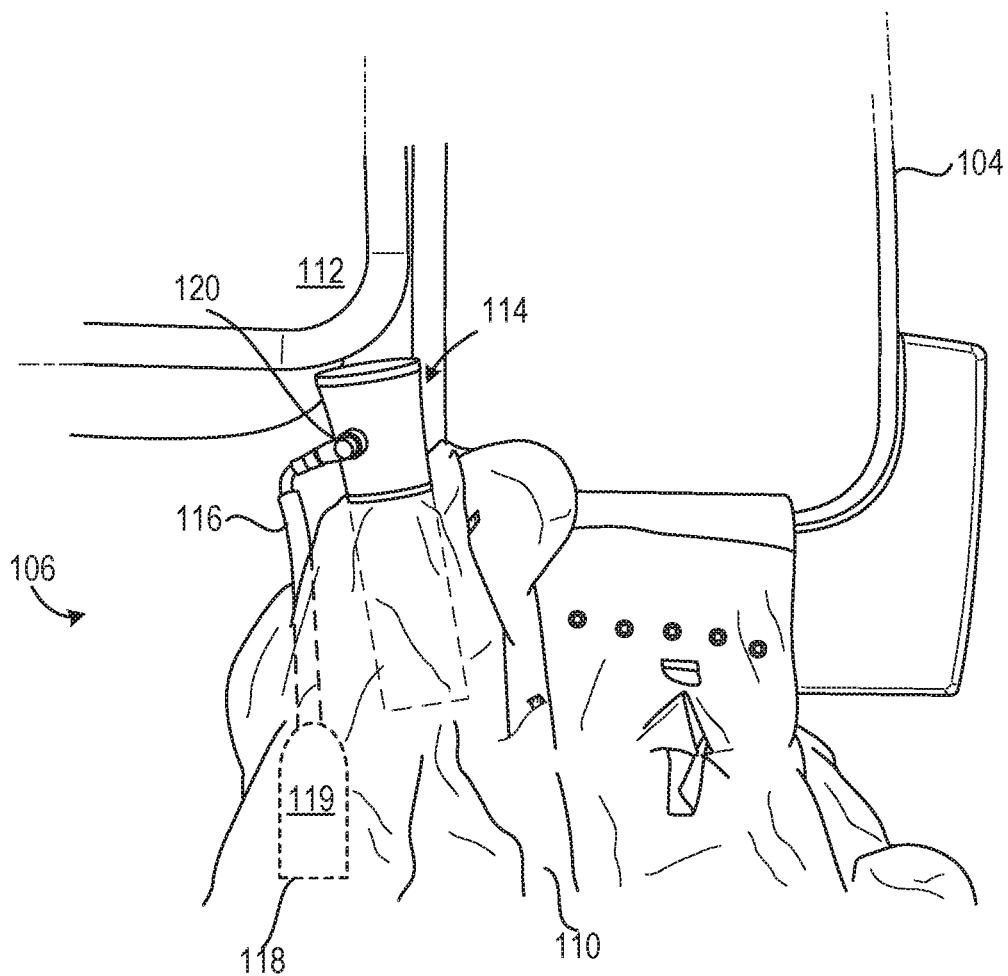
FIG. 2 illustrates an evacuation system, in accordance with various embodiments.

Referring to FIGS. 1 and 2, evacuation system 106 includes an inflatable evacuation device 110. Evacuation system 106 further includes ambient gas 112. The ambient gas 112 may enter the inflatable evacuation device 110 to inflate the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1.

In various embodiments, and referring to FIG. 2, a venting aspirator (also referred to herein as an aspirator) 114 may be coupled to the inflatable evacuation device 110 and pipe assembly 116. A compressed fluid source 118 may be coupled to the pipe assembly 116. Pipe assembly 116 may be coupled to an aspirator inlet 122 of the aspirator 114 via an aspirator hose fitting 120, with momentary reference to FIG. 3. During normal flight conditions, the inflatable evacuation device 110 may be deflated and stored within a compartment of aircraft 100. In various embodiments, inflatable evacuation device 110 and aspirator 114 may be stored in a single package within the aircraft compartment. When inflatable evacuation device 110 is not in use, it may be deflated when packed. In response to deployment of the evacuation system 106, fluid 119 may flow from compressed fluid source 118 into aspirator hose fitting 120 via pipe assembly 116 at a relatively high velocity.

Figure 3:
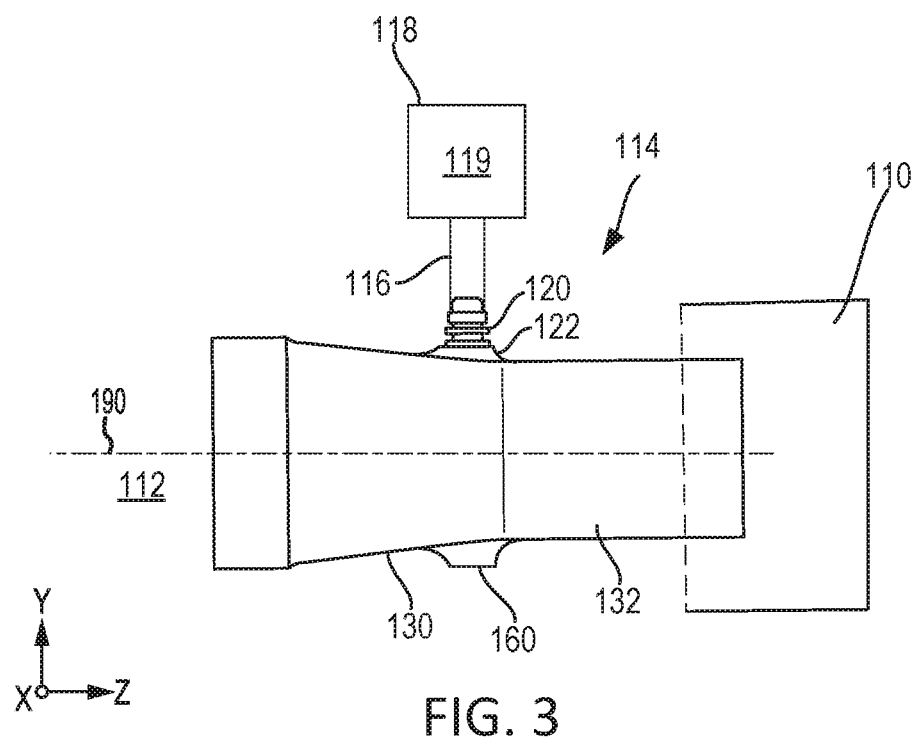
FIG. 3 illustrates a venting aspirator, in accordance with various embodiments.

With reference to FIG. 3, aspirator 114 may include an aspirator body 130. Aspirator body 130 may define a centerline axis 190. Aspirator body 130 may comprise a cylindrical geometry. Aspirator body 130 may comprise a circular, oval, or polygonal cross section. Aspirator body 130 may comprise an aspirator barrel 132. Aspirator barrel 132 may be coupled to inflatable evacuation device 110 whereby a fluid may travel between aspirator 114 and inflatable evacuation device 110. Aspirator hose fitting 120 may extend from aspirator body 130. Aspirator hose fitting 120 may be coupled to pipe assembly 116, which may be coupled to compressed fluid source 118, which may comprise a charged cylinder. Fluid 119 from compressed fluid source 118 may travel through pipe assembly 116 and into aspirator 114 via aspirator hose fitting 120.

Aspirator body 130 may define an aspirator vent 160. When stowed, aspirator vent 160 may allow a fluid to travel freely from between inflatable evacuation device 110 and external to aspirator 114. Stated differently, inflatable evacuation device 110 may be in fluid communication with ambient gas 112 via aspirator vent 160.

Figure 4:
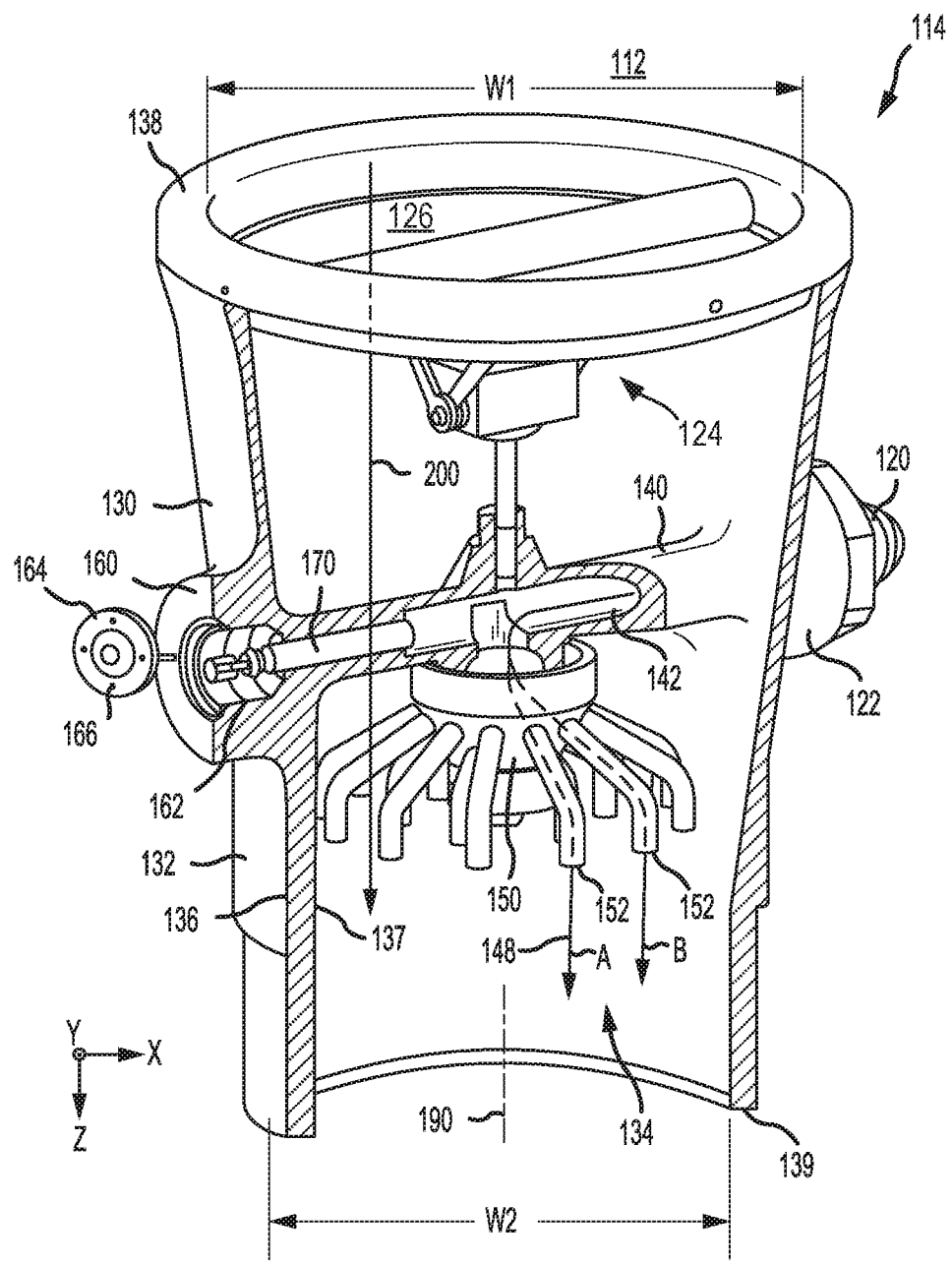
FIG. 4 illustrates a cross-sectional view of a venting aspirator, in accordance with various embodiments.

With reference to FIG. 4, aspirator barrel 132 may comprise barrel outer wall 136 and barrel inner wall 137. Aspirator barrel 132 may comprise air channel 134 disposed between first end 138 and second end 139 and defined by barrel inner wall 137. Width W1 of air channel 134 at first end 138 may be greater than width W2 of air channel 134 at second end 139. A smooth transition may bridge the first end 138 and the second end 139, resulting in a flow of at least one of fluid 119 or ambient gas 112 to be coupled to or adhere to the barrel inner wall 137, thereby avoiding pressure losses.

In various embodiments, a bridge 140 may extend transversely across air channel 134. Bridge 140 may extend at both ends from barrel inner wall 137. Bridge 140 may be hollow. In this regard, bridge 140 may define a channel 142 extending there through. In various embodiments, a nozzle 150 may be coupled to bridge 140. Nozzle 150 may be in fluid communication with channel 142. With combined reference to FIG. 3 and FIG. 4, channel 142 may be in fluid communication with pipe assembly 116, aspirator hose fitting 120, and air channel 134, such that fluid 119 may flow from compressed fluid source 118 through aspirator hose fitting 120 via pipe assembly 116 and into channel 142. Fluid 119 may be directed from channel 142 through nozzle 150 into air channel 134 via first airflow path 148.

With combined reference to FIG. 3 and FIG. 4, fluid 119, which may be high velocity gas, may be directed from compressed fluid source 118 and through pipe assembly 116 and aspirator hose fitting 120. Fluid 119 may be directed through aspirator hose fitting 120 and enter the aspirator body 130 and fill channel 142. Fluid 119 may be directed from channel 142 into nozzle 150. Nozzle 150 may comprise multiple pathways that extend axially into air channel 134. For example, as shown in FIG. 4, fluid 119 may be directed from aspirator hose fitting 120 to nozzle 150 via pathway A and pathway B. Multiple pathways allow for fluid 119 to be entrained by the entire nozzle 150 and travel through multiple outlets 152. The structure of the nozzle 150 allows for a large surface area of fluid 119 traveling into air channel 134.

Fluid 119 may flow from channel 142 through nozzle 150 and into air channel 134. In response to fluid 119 being directed from the compressed fluid source 118 through nozzle 150 and into air channel 134, ambient gas 112 from the environment surrounding the aspirator 114 may be entrained into air channel 134 via second airflow path 200. Ambient gas 112 may be compelled through air channel 134, and ultimately into inflatable evacuation device 110 (shown in FIG. 2 and FIG. 3). Stated differently, aspirator 114 facilitates intake of ambient gas 112 from the environment, which enters air channel 134. The fluid 119 and ambient gas 112 may be directed into the inflatable evacuation device 110. In response to receiving the fluid 119 and ambient gas 112, inflatable evacuation device 110 may begin to inflate.

With reference to FIG. 4, aspirator 114 may comprise a flapper valve arrangement 124 coupled to aspirator body 130, in accordance with various embodiments. Flapper valve arrangement 124 may comprise a flapper plate 126 rotatably coupled to aspirator body 130. Flapper plate 126 may rotate in response to a change in pressure from a fluid via channel 142.

Figure 5B:
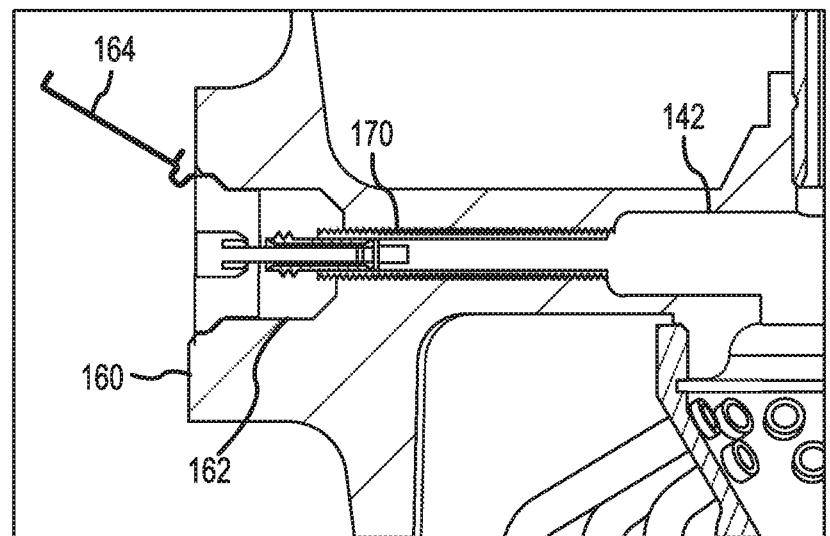
FIG. 5A and FIG. 5B illustrate a cross-sectional view of the venting aspirator, in accordance with various embodiments.
Figure 5A:
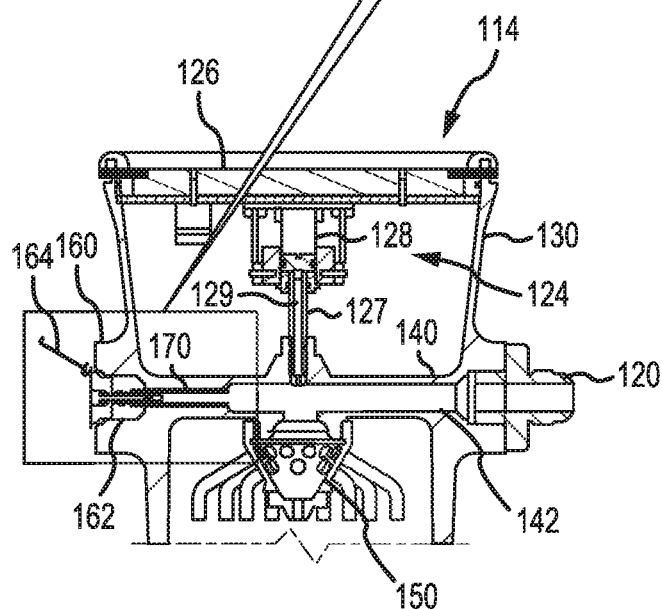

With combined reference to FIG. 4, FIG. 5A, and FIG. 5B, flapper valve arrangement 124 may comprise a piston cylinder 128 operably coupled to a piston shaft 127. Piston shaft 127 may be coupled to bridge 140. Piston shaft 127 may comprise a bore 129 whereby piston cylinder 128 is in fluid communication with channel 142. In this regard, a pressurized fluid may be directed from aspirator hose fitting 120, through channel 142, and into piston cylinder 128, via bore 129. Piston cylinder 128 may translate with respect to piston shaft 127 in response to the pressurized fluid entering piston cylinder 128. Piston cylinder 128 may be operably coupled to flapper plate 126. Therefore, piston cylinder may cause flapper plate 126 to rotate with respect to aspirator body 130 in response to piston cylinder 128 translating with respect to piston shaft 127. In this manner, flapper plate 126 may rotate to an open position in response to fluid 119 being directed into the inflatable evacuation device 110 via first airflow path 148, thereby creating second airflow path 200 whereby ambient gas 112 may enter inflatable evacuation device 110, with momentary reference to FIG. 3 and FIG. 4.

Figure 6A:
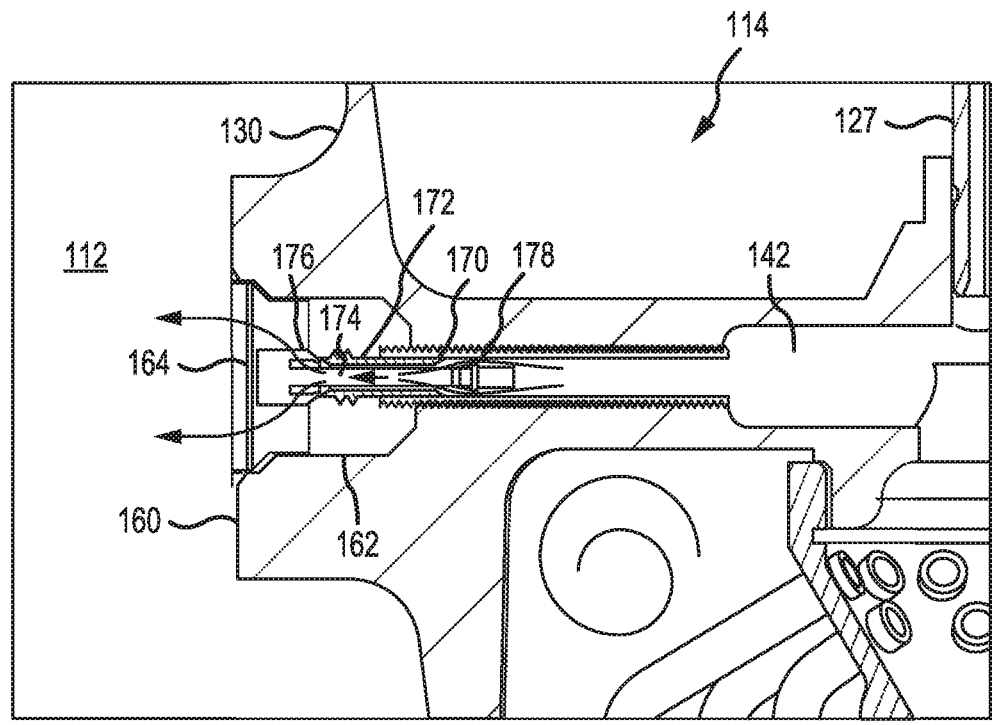
FIG. 6A and FIG. 6B illustrate a cross-sectional view of a valve of the venting aspirator in an open position and a closed position, respectively, in accordance with various embodiments.
Figure 6B:
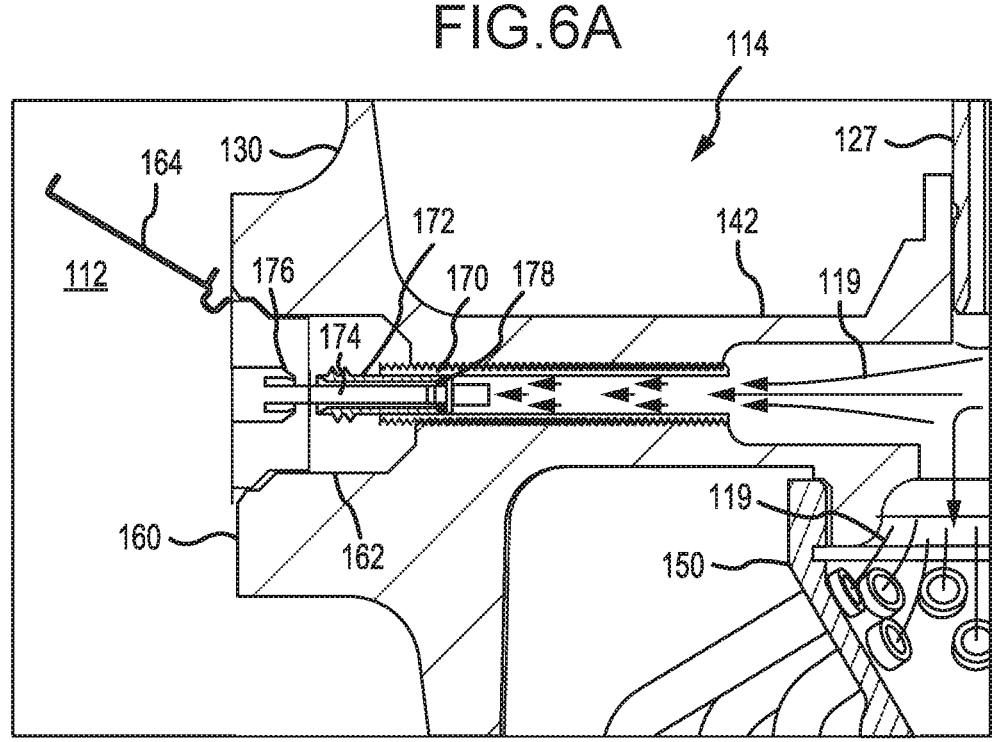

With respect to FIG. 6A and FIG. 6B, elements with like element numbering, as depicted in FIG. 3 through FIG. 5B, are intended to be the same and will not necessarily be repeated for the sake of clarity.

With combined reference to FIG. 4 and FIG. 5B, aspirator vent 160 may define a venting aperture 162, in accordance with various embodiments. A valve 170 may be disposed in venting aperture 162. When the inflatable evacuation device 110 is in storage, or otherwise in an uninflated position, valve 170 may be in a default open position to allow a fluid within inflatable evacuation device 110 to maintain substantially equal pressure with ambient gas 112. A vent cap 164 may be coupled to aspirator vent 160. Vent cap 164 may comprise one or more cap apertures 166 to allow fluid to flow from venting aperture 162 to a location external from aspirator 114 in response to vent cap 164 being in a closed position, as illustrated in FIG. 6A. Stated differently, cap apertures 166 allow vent cap 164 to vent in the closed position.

In various embodiments, with reference to FIG. 6A, valve 170 may comprise a valve core sleeve 172 and a valve core piston 174. Valve core piston 174 may be disposed within valve core sleeve 172. A piston head 176 may be coupled to one end of the valve core piston 174 and a piston gasket 178 may be coupled to the opposite end of the valve core piston 174. Valve core piston 174 may translate with respect to valve core sleeve 172 between an open position (see FIG. 6A) and a closed position (see FIG. 6B). In the open position, the piston gasket 178 may be spaced apart from valve core sleeve 172, thereby allowing a fluid to travel through valve 170 between channel 142 and external to aspirator body 130. In this manner, valve 170 may allow a pressure of a fluid within aspirator body 130 to self-equilibrate with ambient gas 112.

In various embodiments, piston head 176 may abut vent cap 164 in response to vent cap 164 being in a closed position as illustrated in FIG. 6A. Stated differently, vent cap 164 may secure piston head 176 in an open position in response to vent cap 164 being in a closed position. A subtle increase in pressure of a fluid within channel 142 may be insufficient to transmit a force into valve core piston 174 and vent cap 164 sufficient to cause vent cap 164 to move towards an open position and valve core piston 174 to move to a closed position, such as pressure variations that channel 142 may experience during transit and/or during a flight of an aircraft. However, a substantial increase in pressure of a fluid within channel 142, such as an increase in pressure in response to fluid 119 flowing from compressed fluid source 118 into channel 142 at a relatively high velocity, may transmit a force into valve core piston 174 and into vent cap 164 via valve core piston 174 which may force vent cap 164 to move towards an open position thereby allowing valve core piston 174 to move to the closed position, as illustrated in FIG. 6B. Stated differently, piston head 176 may force vent cap 164 to the open position in response to piston head 176 moving to a closed position. In various embodiments, a visual cue may be generated in response to the vent cap 164 moving to an open position which may indicate that the valve 170 has moved to a closed position. Likewise, assurance that the valve 170 is in an open position may be formed by a visual check that the vent cap 164 is in a closed position. In this regard, valve 170 may be in an open position in its neutral or resting state.

With reference to FIG. 6B, piston gasket 178 is compressed against valve core sleeve 172, thereby closing venting aperture 162 from fluid communication with channel 142. In this manner, the pressure of fluid 119 within channel 142 may act against valve core piston 174, thereby holding piston gasket 178 in compression against valve core sleeve 172. In this manner, the fluid 119 is directed through nozzle 150 and into inflatable evacuation device 110, with momentary reference to FIG. 3. In this regard, valve 170 is in a default-open position to allow venting of an inflatable evacuation device and is configured to automatically close in response to an inflation event (i.e., in response to a pressurized fluid (e.g., fluid 119) flowing from a compressed fluid source (e.g., compressed fluid source 118) into the inflatable evacuation device 110), thereby preventing the fluid from escaping the inflatable evacuation device 110.

Figure 7A:
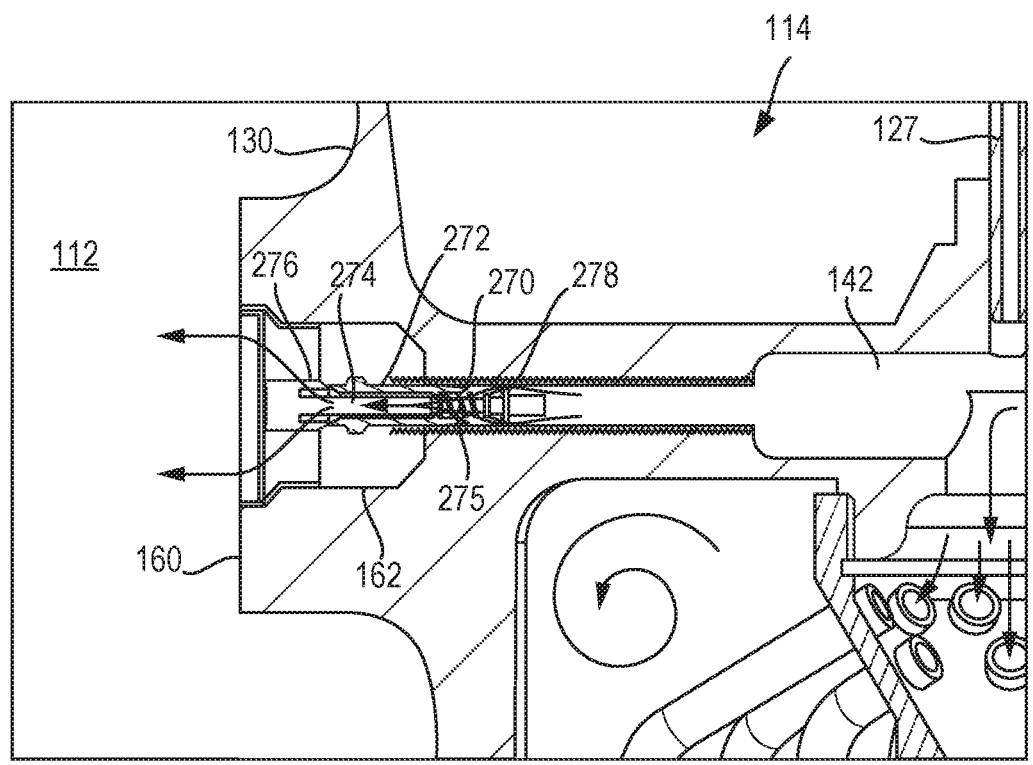
FIG. 7A and FIG. 7B illustrate a cross-sectional view of a valve of a venting aspirator in an open position and a closed position, respectively, in accordance with various embodiments.
Figure 7B:
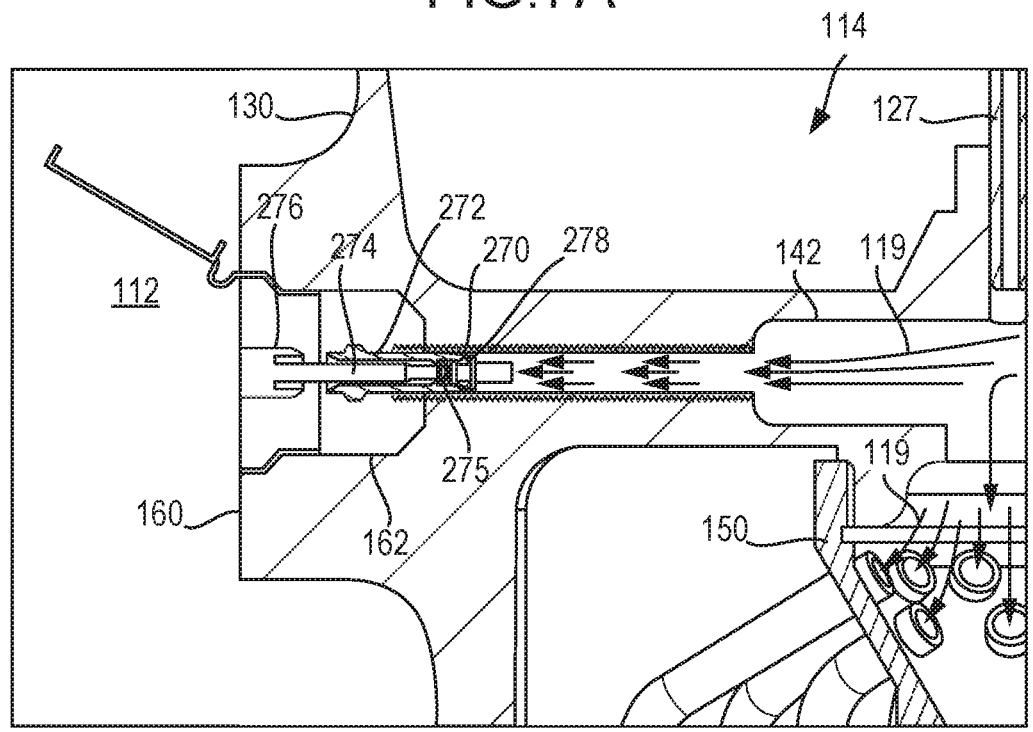

With respect to FIG. 7A and FIG. 7B, elements with like element numbering, as depicted in FIG. 6A and FIG. 6B, are intended to be the same and will not necessarily be repeated for the sake of clarity.

With combined reference to FIG. 7A and FIG. 7B, a valve 270 installed onto a aspirator body 130 is illustrated, in accordance with various embodiments. Valve 270 may be similar to valve 170 (see FIG. 6A and FIG. 6B), except that valve 270 further comprises a spring member 275. In this regard, valve 270 does not rely on a vent cap to secure valve 270 in an open position. Therefore, a valve cap may or may not be used with valve 270, in accordance with various embodiments. Rather, valve 270 may comprise a spring member 275 coupled between a valve core sleeve 272 and a valve core piston 274. Valve core piston 274 may be disposed within valve core sleeve 272. A piston head 276 may be coupled to one end of the valve core piston 274 and a piston gasket 278 may be coupled to the opposite end of the valve core piston 274. Valve core piston 274 may translate with respect to valve core sleeve 272 between an open position (see FIG. 7A) and a closed position (see FIG. 7B). Spring member 275 may bias valve core piston 274 towards an open position. Stated differently, spring member 275 may bias valve 270 towards an open position, as illustrated in FIG. 7A. In the open position, the piston gasket 278 may be spaced apart from valve core sleeve 272, thereby allowing a fluid to travel through valve 270 between channel 142 and external to aspirator body 130. In this manner, valve 270 may allow a pressure of a fluid within aspirator body 130 to self-equilibrate with ambient gas 112.

In various embodiments, piston head 276 may abut valve core sleeve 272 in response to spring member 275 biasing valve core piston towards the open position, as illustrated in FIG. 7A. Piston head 276 may prevent valve core piston 274 from decoupling from valve core sleeve 272. A subtle increase in pressure of a fluid within channel 142 may be insufficient to transmit a force into valve core piston 274 to cause valve core piston 274 to move to a closed position, such as pressure variations that channel 142 may experience during transit and/or during a flight of an aircraft. However, a substantial increase in pressure of a fluid within channel 142, such as an increase in pressure in response to fluid 119 flowing from compressed fluid source 118 into channel 142 at a relatively high velocity, may transmit a force into valve core piston 274 which may overcome the bias of spring member 275 and force valve core piston 274 into a closed position, as illustrated in FIG. 6B. Thus, fluid 119 flowing from compressed fluid source 118 may act upon valve 270 to force valve 270 to the closed position. In this regard, valve 270 may be in an open position in its neutral or resting state and may be moved to the closed position in response to fluid 119 flowing from compressed fluid source 118 into aspirator 114, and specifically into channel 142.

With reference to FIG. 7B, piston gasket 278 is compressed against valve core sleeve 272, thereby closing venting aperture 162 from fluid communication with channel 142. In this manner, all the fluid 119 is directed through nozzle 150 and into inflatable evacuation device 110, with momentary reference to FIG. 3. In this regard, spring member 275 biases valve 270 in a default-open position to allow venting of an inflatable evacuation device, and is configured to automatically close in response to an inflation event (i.e., in response to a pressurized fluid (e.g., fluid 119) flowing from a compressed fluid source (e.g., compressed fluid source 118) into the inflatable evacuation device 110), thereby preventing the fluid from escaping the inflatable evacuation device 110. The valve core piston 274 may be held in the closed position as long as channel 142 is under pressure sufficient to overcome the bias of spring member 275.

Figure 8:
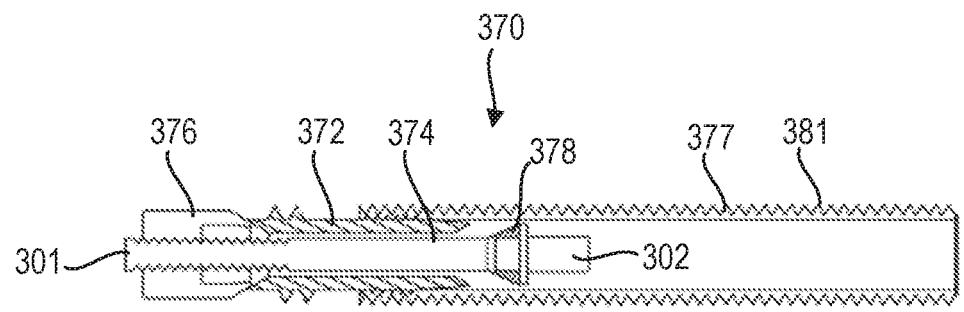
FIG. 8, FIG. 9, and FIG. 10 illustrate valves for a venting aspirator, in accordance with various embodiments.

With reference to FIG. 8, a valve 370 is illustrated, in accordance with various embodiments. In various embodiments, valve 170 of FIG. 6A and FIG. 6B may be similar to valve 370. Valve 370 is illustrated in a neutral or resting state. Valve 370 is illustrated in an open position. Valve 370 may comprise a valve core sleeve 372 and a valve core piston 374. Valve core piston 374 may be disposed within valve core sleeve 372. Valve core piston 374 may extend through valve core sleeve 372. A piston head 376 may be coupled to a first end 301 of the valve core piston 374 and a piston gasket 378 may be coupled to a second end 302 of the valve core piston 374. In various embodiments, piston head 376 may be removably coupled to valve core piston 374. In various embodiments, valve 370 may comprise a valve body 377. Valve core sleeve 372 may be received at least partially into valve body 377. Valve core sleeve 372 may be threadingly coupled to valve body 377. Valve body 377 may comprise helical ridges (commonly referred to as threads) 381 extending therefrom whereby valve body 377 may be threadingly coupled to a device. Piston gasket 378 may be disposed within valve body 377.

Figure 9:
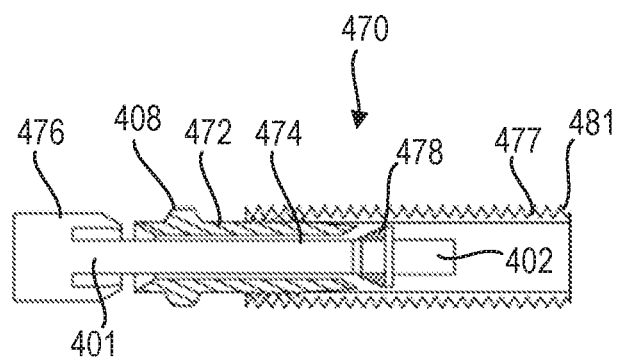

With reference to FIG. 9, a valve 470 is illustrated, in accordance with various embodiments. In various embodiments, valve 170 of FIG. 6A and FIG. 6B may be similar to valve 470. Valve 470 is illustrated in a neutral or resting state. Valve 470 is illustrated in an open position. Valve 470 may comprise a valve core sleeve 472 and a valve core piston 474. Valve core piston 474 may be disposed within valve core sleeve 472. Valve core piston 474 may extend through valve core sleeve 472. A piston head 476 may be coupled to a first end 401 of the valve core piston 474 and a piston gasket 478 may be coupled to a second end 402 of the valve core piston 374. In various embodiments, piston head 476 and valve core piston 474 may be manufactured as a single, monolithic piece. In various embodiments, valve 470 may comprise a valve body 477. Valve core sleeve 472 may be received at least partially into valve body 477. Valve core sleeve 472 may be threadingly coupled to valve body 477. Valve body 477 may comprise helical ridges (commonly referred to as threads) 481 extending therefrom whereby valve body 477 may be threadingly coupled to a device. Piston gasket 478 may be disposed within valve body 477. Valve core sleeve 472 may comprise a tab 408 whereby a tool may rotate valve core sleeve 472 with respect to valve body 477 for installation thereto or removal therefrom.

Figure 10:
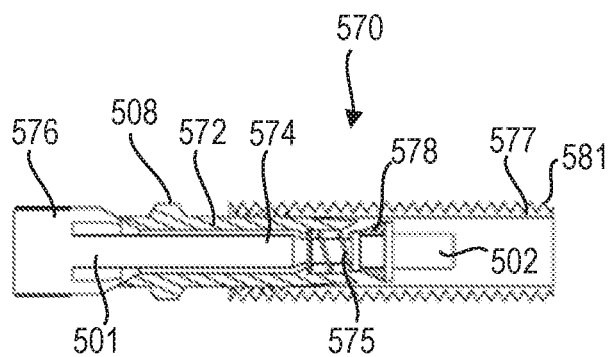

With reference to FIG. 10, a valve 570 is illustrated, in accordance with various embodiments. In various embodiments, valve 270 of FIG. 7A and FIG. 7B may be similar to valve 570. Valve 570 is illustrated in a neutral or resting state. Valve 570 is illustrated in an open position. Valve 570 may comprise a valve core sleeve 572 and a valve core piston 574. Valve core piston 574 may be disposed within valve core sleeve 572. Valve core piston 574 may extend through valve core sleeve 572. A piston head 576 may be coupled to a first end 501 of the valve core piston 574 and a piston gasket 578 may be coupled to a second end 502 of the valve core piston 574. In various embodiments, piston head 576 may be removably coupled to valve core piston 574. In various embodiments, piston head 576 and valve core piston 574 may be manufactured as a single, monolithic piece. In various embodiments, valve 570 may comprise a valve body 577. Valve core sleeve 572 may be received at least partially into valve body 577. Valve core sleeve 572 may be threadingly coupled to valve body 577. Valve body 577 may comprise helical ridges (commonly referred to as threads) 581 extending therefrom whereby valve body 577 may be threadingly coupled to a device. Piston gasket 578 may be disposed within valve body 577. Valve core sleeve 572 may comprise a tab 508 whereby a tool may rotate valve core sleeve 572 with respect to valve body 577 for installation thereto or removal therefrom. Valve 570 may comprise a spring member 575 coupled between valve core sleeve 572 and valve core piston 574. Spring member 275 may bias valve core piston 574 towards an open position. Stated differently, spring member 575 may bias valve 570 towards an open position. In various embodiments, spring member 575 may comprise a coil spring surrounding valve core piston 574. In various embodiments, spring member 575 may be disposed at least partially within valve core sleeve 572.

Figure 11:
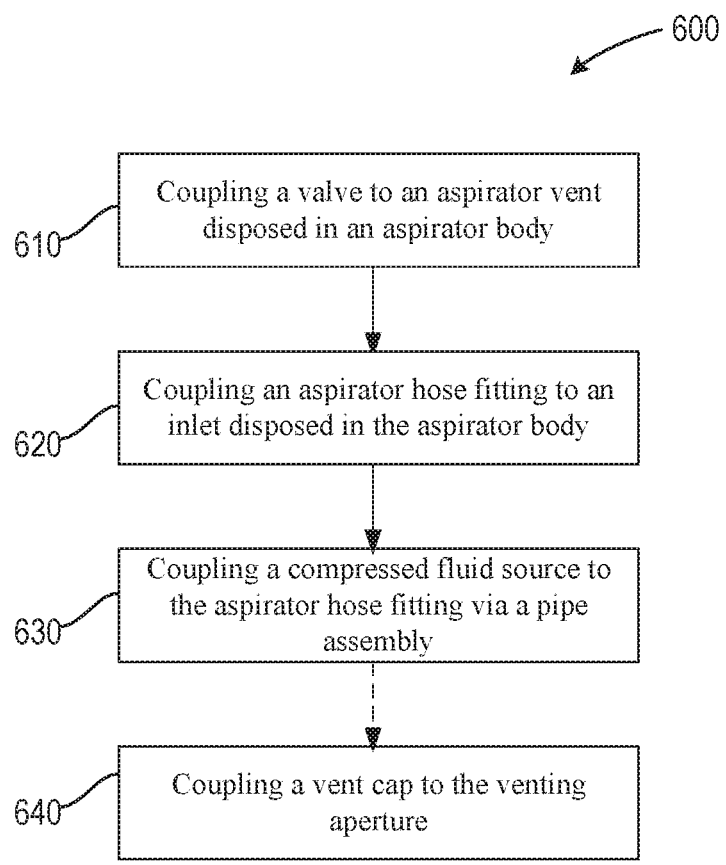
FIG. 11 illustrates an aspirator method, in accordance with various embodiments.

According to various embodiments, and with reference to FIG. 11, an aspirator method 600 is provided. The aspirator method 600 comprises coupling a valve to an aspirator vent disposed in an aspirator body (step 610). The aspirator method 600 comprises coupling an aspirator hose fitting to an aspirator inlet disposed in the aspirator body (step 620). The aspirator method 600 comprises coupling a compressed fluid source to the aspirator hose fitting via a pipe assembly (step 630). The aspirator method 600 may comprise coupling a vent cap to the venting aperture (step 640).

With combined reference to FIG. 3, FIG. 4, and FIG. 11, step 610 may include coupling valve 170 to aspirator vent 160 disposed in aspirator body 130. Step 610 may include coupling an aspirator hose fitting 120 to aspirator inlet 122 disposed in the aspirator body 130. Step 630 may include coupling compressed fluid source 118 to aspirator hose fitting 120 via pipe assembly 116. Step 640 may include coupling vent cap 164 to venting aperture 162.

Aspirator 114 may be comprised of a lightweight, rigid material, such as aluminum, anodized aluminum, polyamide or other plastic, composite, or other suitable material. Aspirator 114 may be formed by additive manufacturing, injection molding, composite fabrication, forging, casting, or other suitable process. As used herein, the term "additive manufacturing" encompasses any method or process whereby a three-dimensional object is produced by creation of a substrate or addition of material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and cold spray. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, is intended to be included within the scope of the present disclosure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator, comprising:
   an aspirator body defining an air channel;
   an aspirator inlet disposed in the aspirator body whereby the air channel receives a compressed fluid;
   a venting aperture disposed in the aspirator body in fluid communication with the air channel; and
   a venting valve disposed in the venting aperture, wherein the venting valve is in an open position and the venting valve moves to a closed position in response to the compressed fluid being received by the aspirator, and the air channel is configured to receive the compressed fluid with the venting valve in the closed position.

2. The aspirator of claim 1, wherein the venting valve allows fluid to travel freely between the air channel and the venting aperture in the open position.

3. The aspirator of claim 2, wherein a force generated by the compressed fluid moves the venting valve to the closed position.

4. The aspirator of claim 3, wherein the aspirator body comprises a barrel outer wall and a barrel inner wall, the barrel inner wall defining the air channel.

5. The aspirator of claim 1, further comprising a vent cap coupled to the aspirator body, wherein the vent cap secures the venting valve in the open position.

6. The aspirator of claim 5, wherein at least a portion of the vent cap moves out from the venting aperture in response to the venting valve moving to the closed position.

7. The aspirator of claim 1, wherein the venting valve comprises:
   a valve body;
   a valve core sleeve;
   a valve core piston; and
   a gasket coupled to the valve core piston, wherein the valve core piston moves with respect to the valve core sleeve and the gasket contacts the valve core sleeve in response to the valve core piston moving to the closed position.

8. The aspirator of claim 7, wherein the venting valve further comprises a spring member configured to bias the venting valve towards the open position.

9. The aspirator of claim 1, further comprising an inflatable evacuation device coupled to the aspirator body.

10. An evacuation system, comprising:
    an aspirator coupled to an inflatable evacuation device; and
    a compressed fluid source coupled to the aspirator via a pipe assembly,
    wherein the aspirator comprises:
      an aspirator body defining an air channel;
      an aspirator inlet disposed in the aspirator body whereby the air channel receives a compressed fluid from the compressed fluid source;
      a venting aperture disposed in the aspirator body in fluid communication with the air channel; and
      a venting valve disposed in the venting aperture, herein the venting valve is in an open position and the venting valve moves to a closed position in response to the compressed fluid being received by the aspirator, and the air channel is configured to receive the compressed fluid with the venting valve in the closed position.

11. The evacuation system of claim 10, wherein the venting valve allows fluid to travel freely between the air channel and the venting aperture in the open position.

12. The evacuation system of claim 11, wherein a force generated by the compressed fluid moves the venting valve to the closed position.

13. The evacuation system of claim 12, wherein the aspirator body comprises a barrel outer wall and a barrel inner wall, the barrel inner wall defining the air channel.

14. The evacuation system of claim 10, further comprising a vent cap coupled to the aspirator body, wherein the vent cap secures the venting valve in the open position.

15. The evacuation system of claim 14, wherein at least a portion of the vent cap moves out from the venting aperture in response to the venting valve moving to the closed position.

16. The evacuation system of claim 10, wherein the venting valve comprises:
    a valve body;
    a valve core sleeve;
    a valve core piston; and
    a gasket coupled to the valve core piston, wherein the valve core piston moves with respect to the valve core sleeve and the gasket contacts the valve core sleeve in response to the valve core piston moving to the closed position.

17. The evacuation system of claim 16, wherein the venting valve further comprises a spring member configured to bias the venting valve towards the open position.

18. An aspirator method, comprising;
    coupling a venting valve to an aspirator vent disposed in an aspirator body, wherein the venting valve is in fluid communication with an aspirator inlet disposed in the aspirator body and the venting valve is in fluid communication with an air channel defined by the aspirator body, wherein the venting valve is in an open position and the venting valve is configured to move to a closed position in response to a compressed fluid being received by the aspirator, and the air channel is configured to receive the compressed fluid with the venting valve in the closed position.

19. The aspirator method of claim 18, further comprising:
    coupling an aspirator hose fitting to the aspirator inlet;
    coupling a compressed fluid source to the aspirator hose fitting via a pipe assembly; and coupling the aspirator body to an inflatable evacuation device.

20. The aspirator method of claim 18, further comprising coupling a vent cap to a venting aperture, wherein the vent cap secures the venting valve in the open position.

\* \* \* \* \*